(12) United States Patent
Nakanishi et al.

(10) Patent No.: US 11,329,698 B2
(45) Date of Patent: May 10, 2022

(54) ELECTRONIC APPARATUS

(71) Applicant: KABUSHIKI KAISHA TOSHIBA, Tokyo (JP)

(72) Inventors: Kensuke Nakanishi, Tokyo (JP); Tomoko Adachi, Kawasaki Kanagawa (JP); Masahiro Sekiya, Tokyo (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 233 days.

(21) Appl. No.: 16/558,526

(22) Filed: Sep. 3, 2019

(65) Prior Publication Data
US 2020/0177240 A1 Jun. 4, 2020

(30) Foreign Application Priority Data
Nov. 29, 2018 (JP) .............................. JP2018-223445

(51) Int. Cl.
| H04B 7/02 | (2018.01) |
| H04W 88/02 | (2009.01) |
| H04J 13/00 | (2011.01) |
| H04L 5/00 | (2006.01) |
| H04L 1/16 | (2006.01) |

(52) U.S. Cl.
CPC ............ *H04B 7/02* (2013.01); *H04J 13/0003* (2013.01); *H04L 5/003* (2013.01); *H04W 88/02* (2013.01); *H04L 1/16* (2013.01)

(58) Field of Classification Search
CPC ..................................................... H04W 84/12
See application file for complete search history.

(56) References Cited

U.S. PATENT DOCUMENTS

| 2005/0135305 A1* | 6/2005 | Wentink ................ H04W 88/04 370/329 |
| 2005/0220145 A1 | 10/2005 | Nishibayashi et al. |
| 2012/0294150 A1 | 11/2012 | Camps Mur et al. |
| 2014/0247711 A1 | 9/2014 | Gantman et al. |

FOREIGN PATENT DOCUMENTS

| JP | 2008054347 A | 3/2008 |
| JP | 2013517720 A | 5/2013 |
| JP | 2016514411 A | 5/2016 |

OTHER PUBLICATIONS

"Wi-Fi Alliance", Wi-Fi EasyMesh™ Specification, Version 3.0,Dec. 7, 2020, pp. 1-163.

(Continued)

*Primary Examiner* — James P Duffy
(74) *Attorney, Agent, or Firm* — Holtz, Holtz & Volek PC

(57) ABSTRACT

According to one embodiment, an electronic apparatus includes receiver circuitry and transmitter circuitry. The receiver circuitry receives a first association request frame from a first electronic apparatus. The transmitter circuitry transmits a first association response frame corresponding to the first association request frame to the first electronic apparatus, and transmits a second association request frame to the first electronic apparatus, in response to receipt of the first association request frame.

20 Claims, 9 Drawing Sheets

(56) References Cited

OTHER PUBLICATIONS

"Part 11: Wireless LAN Medium Access Control (MAC) and Physical Layer (PHY) Specifications", IEEE Standard for Information technology—Telecommunications and information exchange between systems—Local and metropolitan area networks—Specific requirements, IEEE Std 802.11TM—2016, pp. 1-3532.

Winter, et al., "RPL: IPv6 Routing Protocol for Low-Power and Lossy Networks", Internet Engineering Task Force (IETF)—Request for Comments: 6550, Category: Standards Track, Mar. 2012, pp. 1-157.

* cited by examiner

ELECTRONIC APPARATUS

CROSS-REFERENCE TO RELATED APPLICATIONS

This application is based upon and claims the benefit of priority from Japanese Patent Application No. 2018-223445, filed Nov. 29, 2018, the entire contents of which are incorporated herein by reference.

FIELD

Embodiments described herein relate generally to an electronic apparatus.

BACKGROUND

There are wireless communication devices having a plurality of MAC addresses. In a wireless communication device having a plurality of MAC addresses, for example, it is possible to establish an association relationship with another wireless communication device as an access point (AP) and establish an association relationship with yet another wireless communication device as a station (STA), etc.

Conventionally, in a wireless communication device having a plurality of MAC addresses, it is possible to establish a bidirectional association relationship with other wireless communication device(s) having a plurality of MAC addresses by establishing two association relationships between which the relationship between an AP and an STA is reversed, but it is impossible to recognize whether these two association relationships are established with the same other wireless communication device or not.

DETAILED DESCRIPTION

Various embodiments will be described hereinafter with reference to the accompanying drawings.

In general, according to one embodiment, an electronic apparatus includes receiver circuitry and transmitter circuitry. The receiver circuitry is configured to receive a first association request frame from a first electronic apparatus. The transmitter circuitry is configured to transmit a first association response frame corresponding to the first association request frame to the first electronic apparatus and transmit a second association request frame to the first electronic apparatus, in response to receipt of the first association request frame.

First Embodiment

The first embodiment will be described.

Figure 1:
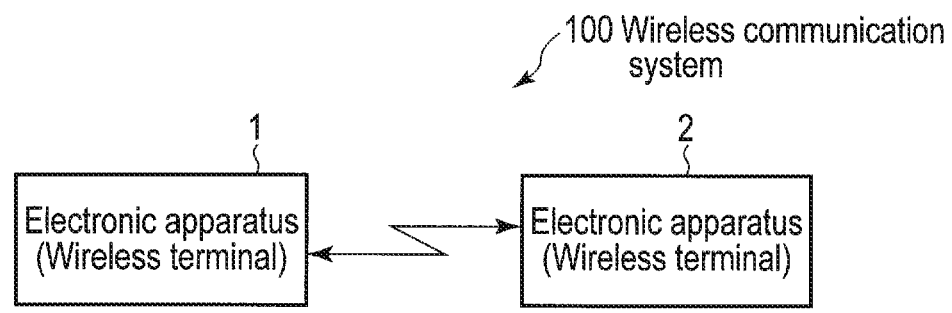
FIG. 1 is a diagram showing an example of a wireless communication system including an electronic apparatus of the first embodiment.

FIG. 1 is a diagram showing an example of a wireless communication system 100 including electronic apparatuses (wireless terminal 1 and wireless terminal 2) of the first embodiment. The wireless terminal 1 and the wireless terminal 2 can be realized as various electronic apparatuses having wireless communication functions, such as personal computers such as tablet computers and notebook computers, and smartphones. As the wireless terminal 1 and the wireless terminal 2 establish an association relationship for wireless communication, the wireless communication system 100 is constituted.

Figure 2A:
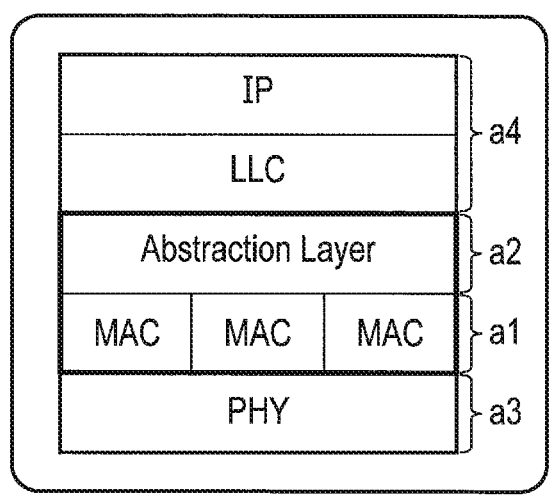
FIG. 2A is a diagram showing an example of a function block configuration of the electronic apparatus of the first embodiment.
Figure 2B:
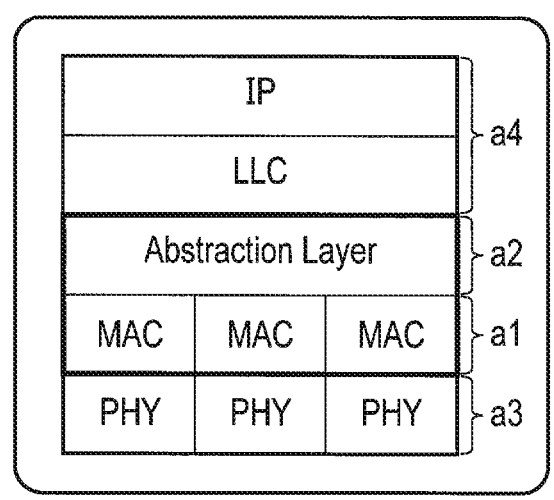
FIG. 2B is a diagram showing another example of a function block configuration of the electronic apparatus of the first embodiment.

Each of the wireless terminal 1 and the wireless terminal 2 is realized by a function block configuration according to a hierarchical model shown in FIGS. 2A and 2B and has a plurality of MAC addresses. The function blocks having the MAC addresses, respectively, are called MAC function blocks. The MAC function blocks of each of the wireless terminals 1 and 2 are organized by an Abstraction function block (a2), and can be regarded as one MAC function block from higher-layer function blocks (a4). The Abstraction function block has function of allocating frames from the higher-layer function blocks to the appropriate MAC function block and function of exchanging frames among the MAC function blocks. The method for allocating frames from the higher-layer function blocks to the appropriate MAC function block and the method for exchanging frames among the MAC function blocks will be described later. In addition, a PHY function block (a3) is provided at a layer-lower than the MAC function blocks. FIG. 2A shows an example where one PHY function block is provided for a plurality of MAC function blocks, and FIG. 2B shows an example where a plurality of PHY function blocks are provided respectively for a plurality of MAC function blocks.

Figure 3:
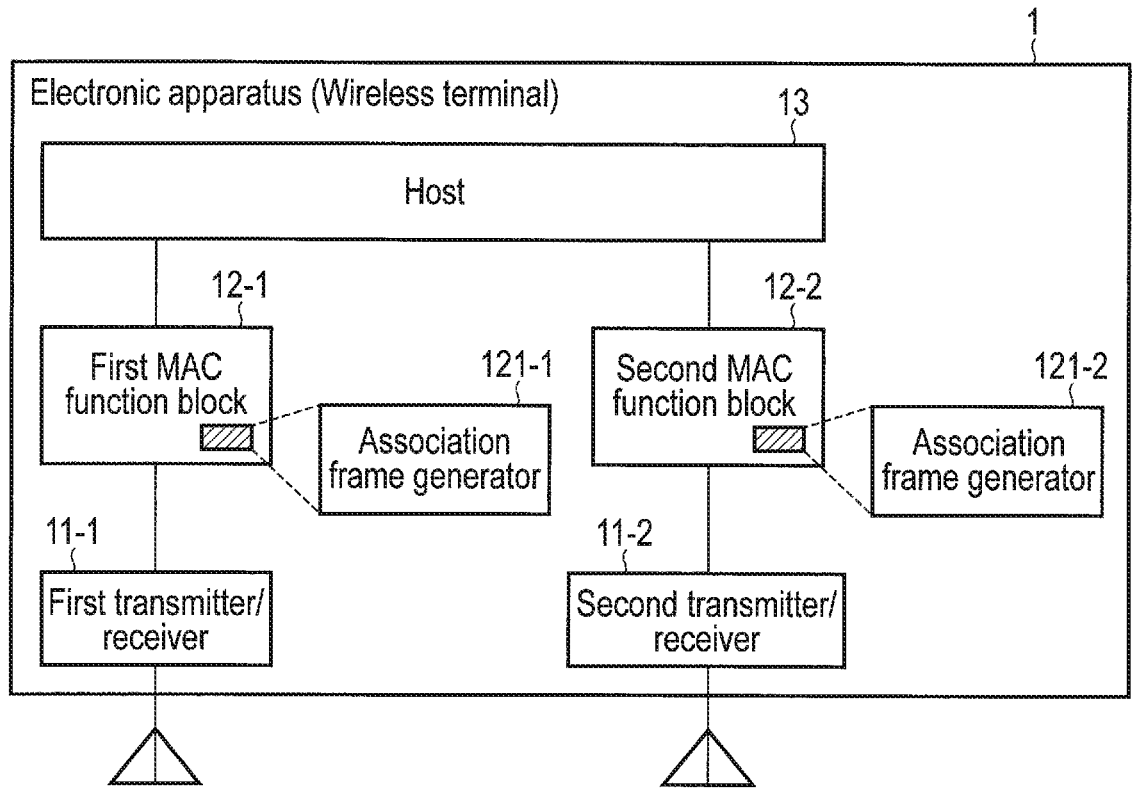
FIG. 3 is a diagram showing a configuration example of the electronic apparatus of the first embodiment.

FIG. 3 shows a configuration example of the electronic apparatuses (wireless terminal 1 and wireless terminal 2) of the present embodiment.

As shown in FIG. 3, each of the wireless terminal 1 and the wireless terminal 2 comprises transmitters/receivers 11 (first transmitter/receiver 11-1 and second transmitter/receiver 11-2) which transmit and receive MAC frames, MAC function blocks (first MAC block 12-1 and second MAC block 12-2) which generate the MAC frames described above or perform access control of a wireless medium (air), and a host function block 13.

The transmitters/receivers 11, the MAC function blocks 12, and the host function block 13 may be individually configured as electronic circuits (circuitries). Alternatively, some or all of them may be constituted as one electronic circuit. Furthermore, these may be constituted by firmware which is stored in a memory device and is executed by a processor, or the like.

The transmitters/receivers 11 provide the function corresponding to the PHY function block of FIGS. 2A and 2B. FIG. 3 shows the case of FIG. 2B where PHY function blocks are connected respectively to MAC function blocks. In the case of FIG. 2A where a PHY function block is common among a plurality of MAC function blocks, one transmitter/receiver 11 is provided and is connected to the MAC function blocks. FIG. 3 shows an example where two MAC function blocks 12 are provided. For example, the MAC function blocks 12 include association frame generators 121 (association frame generator 121-1 and association frame generator 121-2), respectively. Each of the association frame generators 121 generates an Association Request frame or an Association Response frame necessary for executing an association process. Each of the MAC function blocks 12 is connected to the host function block 13. The host function block 13 includes the Abstraction function block corresponding to the Abstraction layer and the function blocks corresponding to the higher-level layers in FIGS. 2A and 2B.

Figure 4:
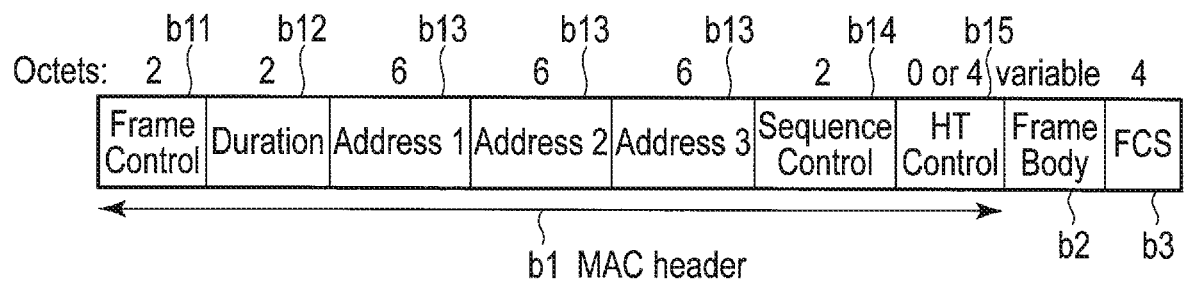
FIG. 4 is a diagram showing a format example of a management frame.

In the present embodiment, frames in a wireless LAN system specified by the IEEE 802.11 standards are used. Here, in addition to IEEE 802.11a, IEEE 802.11b, IEEE 802.11g, IEEE 802.11n, IEEE 802.11ac, IEEE 802.11ax and the like, successor standards to IEEE 802.11 which will be defined in the future are also covered by saying the IEEE 802.11 standards. FIG. 4 shows an example of a format of a management frame. The management frame is a frame used for forming a Basic Service Set (BSS), connecting to or disconnecting from an STA (also including an AP) and the like. As the frame having the format shown in FIG. 4, there are a data frame which carries a packet from a higher-layer function block, a control frame which is used for controlling communication at a MAC level, and the like, in addition to the management frame. The type of a frame is identified by a Type in a Frame Control (b11) of a MAC Header portion (b1) which will be described later, and the subtype such as an Association Request is identified by a Subtype in the Frame Control.

The management frame includes a MAC Header portion (b1), a Frame Body portion (b2) and a Frame Check Sequence (FCS) portion (b3).

Information necessary for a receiving process in a MAC function block is set in the MAC Header portion. Information according to a type of frame is set in the Frame Body portion. A Cyclic Redundancy Code (CRC), which is an error detection code used for determining whether the MAC Header portion and the Frame Body portion have been normally received or not is set in the FCS portion.

The MAC Header portion includes a Frame Control field (b11) in which a value according to a type of a frame is set, a Duration field (b12) and the like. The MAC Header portion further includes a plurality of Address fields (b13). A MAC address of a direct receiver (Receiving Address: RA) is set in an Address 1 field. A MAC address of a direct transmitter (Transmitting Address: TA) is set in an Address 2 field. An address such as a BSSID is set in an Address 3 field. In a case where an AP constitutes a BSS, the BSSID is equal to the MAC address of the AP.

The MAC Header portion further includes a Sequence Control field (b14). The sequence number of data to be transmitted and the fragment number of data in a case where data is fragmented are set in the Sequence Control field.

The Frame Control Field (b11) includes a Type field and a Subtype field which indicate a type and subtype of a frame, a To DS field, a From DS field, a More Fragment field, a Protected frame field, an Order field, and the like.

It is possible to recognize a frame type to which a MAC frame belongs among the control frame, the management frame and the data frame by a bit string which is set in the Type field. In addition, a detailed type of a MAC frame in each frame type is indicated by a bit string of the Subtype field.

In addition, information indicating whether a receiver is a wireless access point (AP) or a wireless station (STA) is set to the To DS field, and information indicating whether a transmitter is a wireless access point or a wireless station is set to the From DS field.

The More Fragment field holds information indicating whether there is a subsequent fragment frame or not in a case where data is fragmented. Information indicating whether the frame is protected or not is set in the Protected frame field. Information indicating that the order of frames cannot be changed when the frames are relayed is set in the Order field. In some cases, the information of the Order field may indicate the presence or absence of an option field which will be described later.

The MAC Header portion may further include a High Throughput (HT) Control field (b15). The HT control field exists when the Order field is set to 1 in the case of a QoS data or a management frame. The HT Control field can be expanded to a Very High Throughput (VHT) Control field or a High Efficient (HE) Control field. In each case, it is possible to perform notifications according to the functions of IEEE 802.11n, IEEE 802.11ac or IEEE 802.11ax.

The configuration of the MAC Header portion is not limited to the above-described fields. When a new successor standard to IEEE 802.11 is defined, a new field may be added to the MAC Header portion, accordingly.

Next, a process for establishing such a bidirectional association relationship that each of the wireless terminal 1 and the wireless terminal 2 can perform both the function of an AP and the function of an STA will be described.

Here, the function of the AP indicates the function of simultaneously collecting packets from a plurality of destinations or transmitting packets to a plurality of destinations by using multiuser communication (hereinafter MU communication) based on IEEE 802.11ax, for example, and the function of the STA indicates the function of the wireless terminal other than the AP in the MU communication described above.

In addition, the association is one connection process in which the STA connects to the AP, in other words, the STA joins the BSS constituted by the AP, and normally, the AP responds to a request from the STA. If the AP accepts the request (a Status Code field of a response frame is 0 (SUCCESS)), an association identifier (AID) is assigned to the STA. Consequently, the STA can transmit data frames in the BSS constituted by the AP.

Two MAC function blocks 12-1 and 12-2 in the wireless terminal 1 will be referred to as AP1 and STA1, and similarly, two MAC function blocks 12-1 and 12-2 in the wireless terminal 2 will be referred to as AP2 and STA2. That is, each of the wireless terminal 1 and the wireless terminal 2 comprises an access point module and a station module which are realized by the MAC function blocks 12-1 and 12-2 which have different MAC addresses from each other. In the following, STA1 is associated with AP2 and STA2 is associated with AP1.

Figure 5:
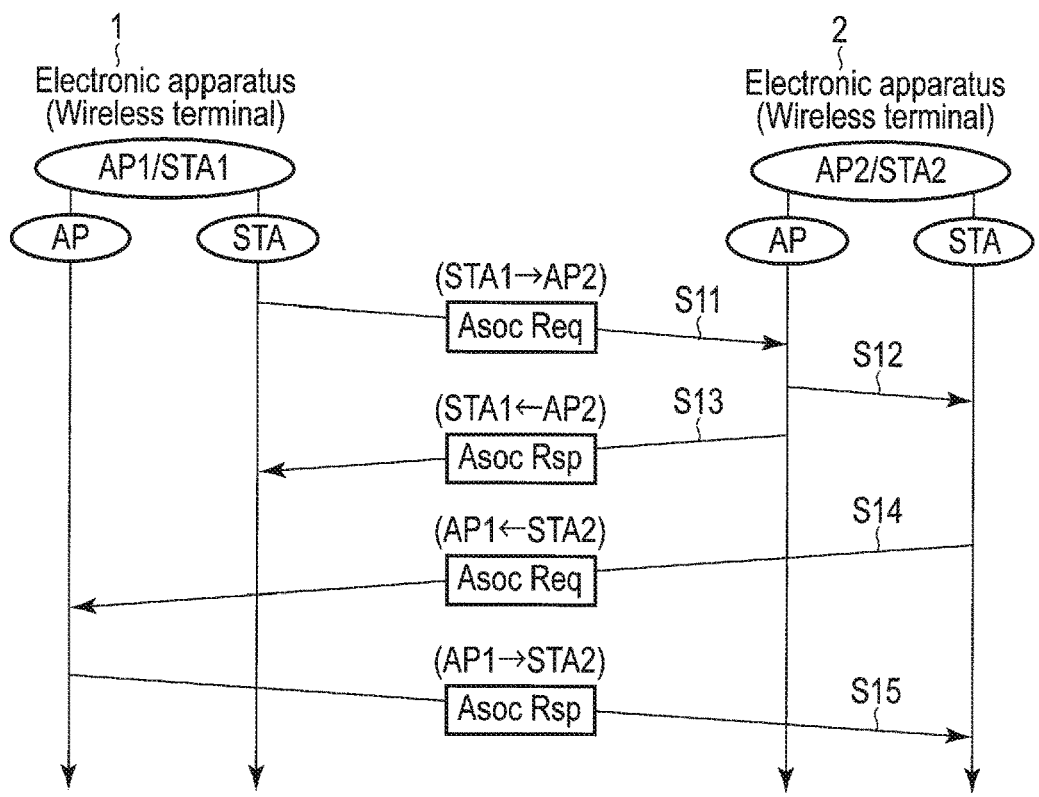
FIG. 5 is a diagram showing an example of a process flow of bidirectional association relationship establishment of the electronic apparatus of the first embodiment.

Since the wireless terminal 1 and the wireless terminal 2 are symmetrical, here, a case where the process is started from the wireless terminal 1 will be considered. An example of the process flow of bidirectional association relationship establishment is shown in FIG. 5.

In the process flow of bidirectional association relationship establishment, first, an STA which already knows the presence of AP2 and the information about AP2 from a Beacon or a Probe Response transmitted from the wireless terminal 2, a precondition, and the like, transmits an Association Request (Asoc Req), which is one of management frames, to AP2 (S11).

Here, the information about AP2 at least includes the MAC address of AP2 and may further include information which is known and necessary for association, such as a Service Set Identifier (SSID).

STA1 notifies information indicating Capability Information, a Listen Interval, and an SSID to which STA1 is to be connected, and also notifies information necessary for association and communication (such as Supported Rates and BSS Membership Selectors and Power Capability) by the Asoc Req.

As STA1 transmits the Asoc Req to AP2, the association process between STA1 and AP2 starts, and in the present embodiment, the wireless terminal 1 notifies information about AP1 to the wireless terminal 2 by using the Asoc Req.

Here, the information about AP1 indicates necessary information of information necessary for completing the association (for example, the MAC address, the communication channel of AP1, and the like) except for information which has already known as a precondition and information which has already been notified from AP1 to the STA by a Beacon or a Probe Response (since the MAC address of an AP is a BSSID, when the MAC address of an AP is notified, the BSSID can be associated with a Beacon/Probe Response). If there is no information to be notified, information indicating that AP1 which can establish an association exists in the wireless terminal 1 to which STA1 belongs will be the information about AP1. Based on the information about AP1, the wireless terminal 2 can identify that the wireless terminal 1 comprises an access point module and a station module which are assigned with different MAC addresses from each other. In addition, the wireless terminal 2 can transmit an Asoc Req which will be described later to the wireless terminal 1 based on the information about AP1.

As the means for notifying the information about AP1 by the Asoc Req, it is possible to consider newly defining an element in an Association Request frame body, using a Vendor Specific element added at the end of the Association Request frame body, or the like. Currently, IEEE 802.11 is short of element IDs for identifying elements. Therefore, when 255, which is a maximum value, is set to an Element ID, an Element ID Extension subfield is added such that an element can be identified by the Element ID Extension subfield. For example, a value which is not assigned in the existing IEEE 802.11 standards can be used as the Element ID Extension subfield to define a new element. At least information about the MAC address of AP1 is included in the new element or the Vendor Specific element. In a case where AP1 has not transmitted a Beacon frame, information which is conventionally notified by a Beacon frame may be included. For example, in a case where the SSID is shared between the wireless communication terminals, the SSID used in AP2 and the SSID used in AP1 are common, and therefore even if information which is conventionally notified by a Beacon frame is omitted, the information can still be processed as known information in STA2.

If the wireless terminal 2 does not have a plurality of MAC function blocks or cannot recognize the Element ID, the association with AP1 is not executed but ignored.

Figure 6:
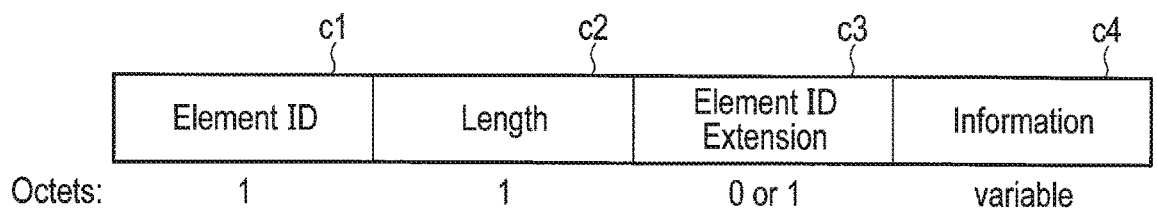
FIG. 6 is a diagram showing a format of an element stored in an Association Request frame body.

The format of an element included in the Association Request frame body or the like is shown in FIG. 6. In the basic configuration of the format of the element, first, an Element ID field (c1) for identifying an element is provided at the forefront, and subsequently, a Length field (c2) representing the total sum of subsequent field lengths as an octet length is provided. If the Element ID field is 255, an Element ID Extension field (c3) for expanding the Element ID number is further provided. Furthermore, an Information field (c4) for storing information about the Element ID is included.

The Information field may include only one information as is the case with the SSID element whose Element ID is 0 or may include a plurality of information as is the case with the Power Capability element whose Element ID is 33. That is, it is possible to notify information having arbitrary length up to a maximum expressed by one octet which can be designated in the Length field by arbitrary numbers. In the case of including a plurality of Information fields after the Length field, when the Information fields are fixed values, if the Information fields are defined in advance, information can be extracted from the Information fields on the receiver side. In the case of making the lengths of some of the Information fields variable, subfields necessary for specifying the field lengths need to be added in front of the Information fields, respectively.

The case of constructing a frame in which the MAC address of AP1 is defined in a Vendor Specific element will be described. The Vendor Specific element is provided for entering information which is notified for the convenience of each vendor and is not defined in IEEE 802.11 wireless LAN standards.

First, to notify that the element is a Vendor Specific element, 221 is set to the Element ID. Next, a value representing the length of subsequent Organization Identifier field and Vendor-specific content field is set to the Length field. The Organization Identifier identifies an organization for which the information is specifically used. As the Vendor-specific content, the MAC address of AP1 is described in the present embodiment.

Figure 7:
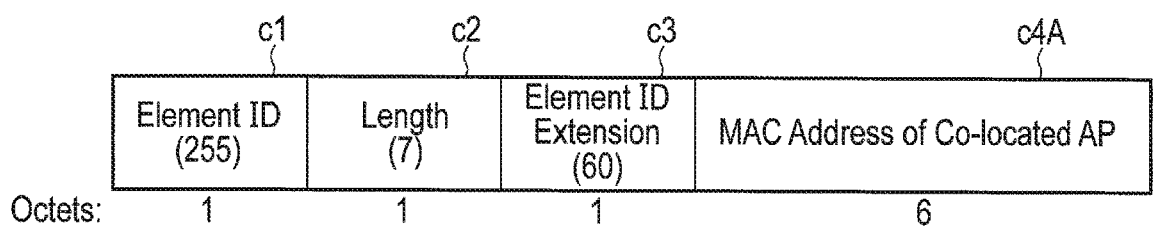
FIG. 7 is a diagram showing an example of a Co-located AP Info element created in accordance with the format of FIG. 6 in the electronic apparatus of the first embodiment.

In the case of defining a new element, it is possible to set 255 to the Element ID and use a value which is not used in the existing IEEE 802.11 standards (such as 0 to 8, 12, 52, . . . , etc.) as the Element ID Extension or to use a value which is not used in the existing IEEE 802.11 standards (such as 2, 8, 9, . . . , etc.) as the Element ID. In the latter case, the Element ID Extension field is not required. Subsequently, the Information field is named, for example, MAC Address of Co-located AP field, and the MAC address of AP1 is described in the field. Since the MAC address of the AP is equivalent to the BSSID of the BSS constituted by the AP, the Information field may be named Co-located BSSID field instead of MAC Address of Co-located AP field. Since the MAC address of the AP consists of six octets, the Length field will be 7 in a case where the Element ID Extension field is included and will be 6 in a case where the Element ID Extension field is not required and does not exist. In addition, in a case where the MAC address of STA1 and the MAC address of AP1 are common in one part (for example, at the forefront), six octets of the MAC address of AP1 may not be entirely indicated but may be indicated in such an abbreviated manner that the first X octets are common and the remaining (6–X) octets are . . . , etc. In any way, the received Asoc Req needs to include information which allows STA2 to generate the Asoc Req to AP1 on the side of the wireless terminal which received the Asoc Req. FIG. 7 shows an example of the element in which, for example, 255 is set to the Element ID, for example, 60 is selected as the Element ID Extension, and the MAC Address of Co-located AP field consisting of six octets is entered. For example, this new element is named Co-located AP Info element (c4A).

Now, the explanation of the process flow of bidirectional association relationship establishment will be continued with reference to FIG. 5.

AP2, which received the Asoc Req in (S11), receives an association request from STA1 and simultaneously knows that the wireless terminal 1, which comprises STA1, comprises AP1. Consequently, AP2 transmits an Association Response (Asoc Rsp), which is one of management frames, for completing the association process with STA1, to STA1 (S13). AP2 also transmits new information about AP1 which allows STA2 to associate with AP1 via the Abstraction function block (S12). The Abstraction function block manages the MAC addresses of the MAC function blocks in a table, etc., and can appropriately notify the information received from AP2 to STA2. Alternatively, a function block which executes a Station Management Entity (SME) may be separately provided, and the information may be notified by using the function block. Here, the SME is a manager which can transmit a command such as to start association, and information to each of all the connected MAC function blocks.

As described above, the information can be notified from AP2 to STA2 in various manners, and the present embodiment is not intended to limit the notification method to any particular method. In addition, the order of (S12) and (S13) may be reversed.

In addition to such as the Capability Information, the Status Code, and the AID assigned from the AP to the STA, information where appropriate (for example, Supported Rates and BSS Membership Selectors, an EDCA Parameter Set, and the like) are notified by the Asoc Rsp.

STA1 processes the received Asoc Rsp, and if the value of the Status Code is 0, that is, SUCCESS, the association relationship between AP2 and STA1 is thereby established. When the association relationship is established, data frames can be exchanged between AP2 and STA1.

On the other hand, in STA2 which received the information about AP1, an Asoc Req to AP1 is created and transmitted based on the information (S14).

AP1 processes the received Asoc Req and transmits an Asoc Rsq to STA2 (S15).

STA2 processes the received Asoc Rsq, and the association between AP1 and STA2 is thereby completed.

Since the Asoc Req transmitted from the wireless terminal 1 first serves as a trigger and the association relationships (association relationship between AP2 and STA1 and association relationship between AP1 and STA2) are established, the following benefits are obtained.

First, the wireless terminal 2 can know that AP1 and STA1 are included (co-located) in the wireless terminal 1. Conventionally, an AP can notify the presence of another AP using a neighbor report but cannot notify whether an AP is co-located or not. Of course, an AP cannot notify information about an STA which is co-located with the AP, and conversely, an STA cannot notify information about an AP co-located with the STA.

In addition, efficiency of channel scanning can be improved. Conventionally, to establish a mutual association relationship, STA1 and STA2 independently detect the communication channels of AP2 and AP1 and start association processes (it is impossible to recognize whether they are co-located or not). On the other hand, in the present embodiment, when one side can detect a communication channel, a frame for starting an association is transmitted, and this serves as a trigger for completing both associations. Therefore, association can be more efficiently performed. Especially if a PHY function block is common, it is not necessary to switch channels each time between an AP and an STA. In addition, even if there are a plurality of PHY function blocks, the time required for channel detection is shorten, and it is not necessary to consider handling a case where the channel of an AP and the channel of an STA of the same wireless terminal overlap each other.

Furthermore, since wireless terminals are mutually associated with each other, the wireless terminals constituting a mesh network can mutually perform the function of an AP. Consequently, in various situations such as routing, diverse routing (route diversity) and network monitoring, multiuser communication can be performed and time efficiency improvement in information transmission can be expected.

Either an STA in a case where a frame is transmitted by uplink MU communication or an AP in a case where a frame is transmitted by downlink MU communication will be a MAC function block which processes the frame, and the determination of a MAC function block to which input data from a higher-layer function block is allocated is performed by the Abstraction function block. The Abstraction function block manages the MAC addresses of MAC function blocks using a table, etc., and allocates data from a higher-layer function block to a MAC function block by setting some rule or policy for allocation.

As described above, in the electronic apparatus of the present embodiment, it is possible to establish a bidirectional association relationship while recognizing that the bidirectional association relationship is established with the same external apparatus.

Second Embodiment

Next, the second embodiment will be described.

Since the present embodiment is basically based on the first embodiment, differences will be mainly described here.

Figure 8A:
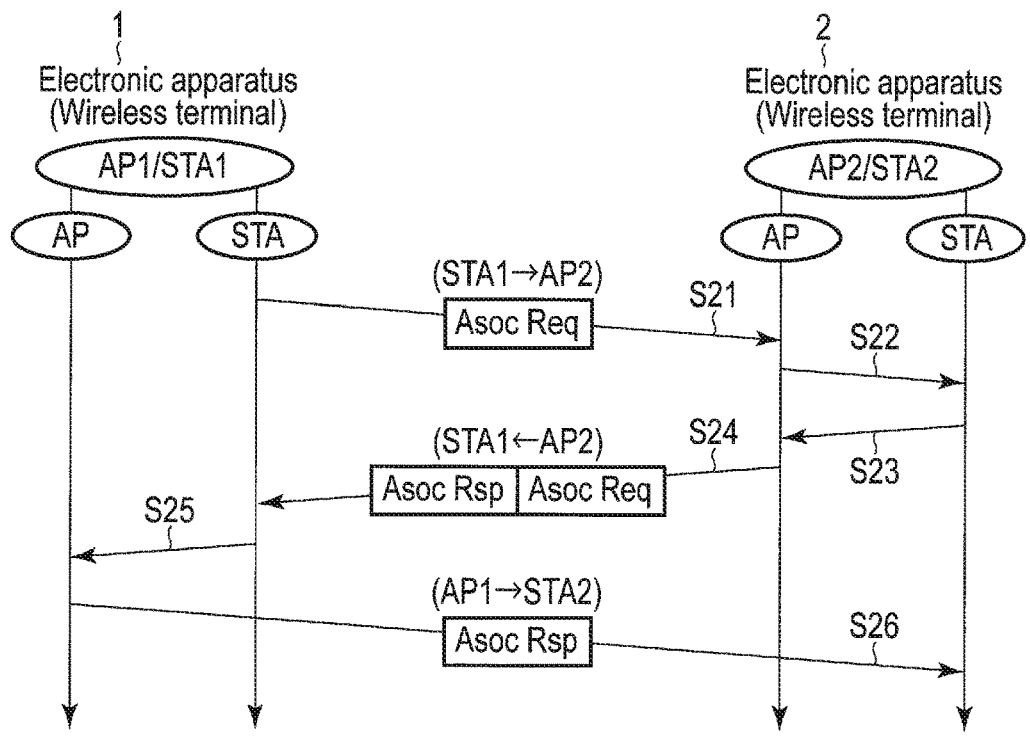
FIG. 8A is a diagram showing an example of a process flow of bidirectional association relationship establishment of an electronic apparatus of the second embodiment (in a case where an AP aggregates an Asoc Rsp and an Asoc Req).
Figure 8B:
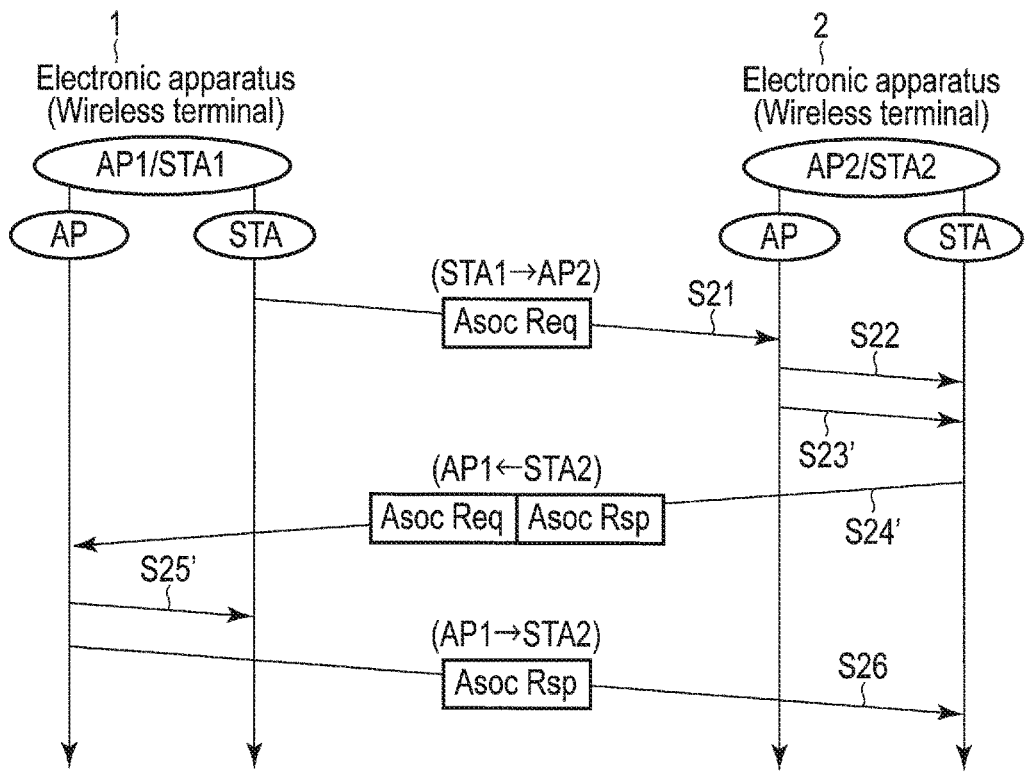
FIG. 8B is a diagram showing another example of the process flow of bidirectional association relationship establishment of the electronic apparatus of the second embodiment (in a case where an STA aggregates an Asoc Rsp and an Asoc Req).

Each of FIGS. 8A and 8B shows an example of a process flow of bidirectional association relationship establishment in the electronic apparatuses (wireless terminal 1 and wireless terminal 2) of the present embodiment.

The present embodiment differs from the first embodiment in that, while the Asoc Rsp from AP2 to STA1 and the Asoc Rep from STA2 to AP1 are separately transmitted in the first embodiment, the Asoc Rep and the Asoc Rsp are integrated in the same physical packet (physical frame) in the present embodiment. FIG. 8A shows an example of a case where AP2 aggregates the Asoc Rsp and the Asoc Req and transmits them to the wireless terminal 1 by unicast or multiplexing. On the other hand, FIG. 8B shows an example of a case where STA2 aggregates the Asoc Rsp and the Asoc Rsp and transmits them to the wireless terminal 1 by unicast or multiplexing. The process flow of bidirectional association relationship establishment in the present embodiment will be described with reference to FIGS. 8A and 8B. Note that, as is the case with the first embodiment, the process starts from the wireless terminal 1.

In the present embodiment also, in the process flow of bidirectional association relationship establishment, first, STA1, which already knows the presence of AP2 and the information about AP2 from a Beacon or a Probe Response transmitted from the wireless terminal 2, a precondition, and the like, transmits an Asoc Req to AP2 (S21).

AP2, which received the Asoc Req from STA1, can know from the information about AP1 included in the Asoc Req that the wireless terminal 1, comprises STA1, further comprises AP1. AP2 creates an Asoc Rsp for completing the association with STA1. Furthermore, AP2 transmits the obtained information about AP1 such that STA2 can start an association process with AP1 (S22).

As is the case with the first embodiment, if the wireless terminal 2 does not comprise a plurality of MAC function blocks or cannot recognize an element ID, the association with AP1 is not executed but ignored, and the process ends.

Examples of multiplexing of frames are frame aggregation, frequency multiplexing by transmitting frames using different frequency bandwidth, space-division multiplexing by transmitting frames using a plurality of antennas, code multiplexing by transmitting frames using different codes, and orthogonal frequency multiplexing by transmitting frames using different subcarriers even with the same frequency bandwidth.

In the current step (S22) of the process flow, since the association has not been completed, there may be information which is necessary for performing multiplexing but has not been shared yet. For example, in the case of multiplexing the Asoc Rsp to STA1 and the Asoc Req to AP1 using frequency multiplexing or space-division multiplexing specified by the IEEE 802.11ax standard, the multiplexing takes a form of Downlink (DL) multiplexing. In this case, AID information is necessary for indicating the transmission destination of each resource unit or each stream in the HE-SIG-B field included in a PHY Header. However, the AID information is information which is shared by association. Therefore, in a case where there is missing information, temporary values are assigned by the frame transmitted in the previous step (S21).

In a case where temporary AID values are assigned for realizing multiplexing during an association process, for example, an element called Temporary AIDs for Association Interval is provided. To identify a frame in which the Asoc Rsq to STA1 and the Asoc Req to AP1 are multiplexed, AIDs which are temporarily assigned, respectively, in the wireless terminal 1 on STA1/AP1 side are designated and are included in the Asoc Req transmitted from STA1 to AP2 by this element. In the case of selecting values from a conventional AID range of values of 1 to 2007 for the temporary AIDs, it is preferable to select values while excluding the values of already assigned AIDs, if any.

It is assumed that STA1 designates in the Temporary AIDs for Association Interval element carried by the Asoc Req that 2001 is used as the temporary AID for STA1 and 2002 is used as the temporary AID for AP1, for example. AP2 receives and decodes the Asoc Req and understands that, by designating the AID as 2001 for STA1, and designating the AID as 2002 for AP1 with respect to the HE-SIG-B field, the transmitted multiplexed packet can be received and decoded on STA1/AP1 wireless terminal side. For example, in the case of considering an orthogonal frequency division multiple access method as a multiplexing method, it becomes possible, by transmitting the Asoc Rsq directed to STA1 in, for example, a subcarrier group 1 (referred to also as Resource Unit (RU) 1) and the Asoc Req directed to AP1 in another subcarrier group 2 (referred to also as RU 2) and notifying that the PHY payload directed to AID=2001 (that is, MAC frame) uses the subcarrier group 1 and the PHY payload directed to AID=2002 uses the subcarrier group 2 in the HE-SIG-B field of the PHY Header of the multiplexed packet, to receive the PHY packet and decode the desired PHY payload at STA1 and AP1 respectively.

Figure 9:
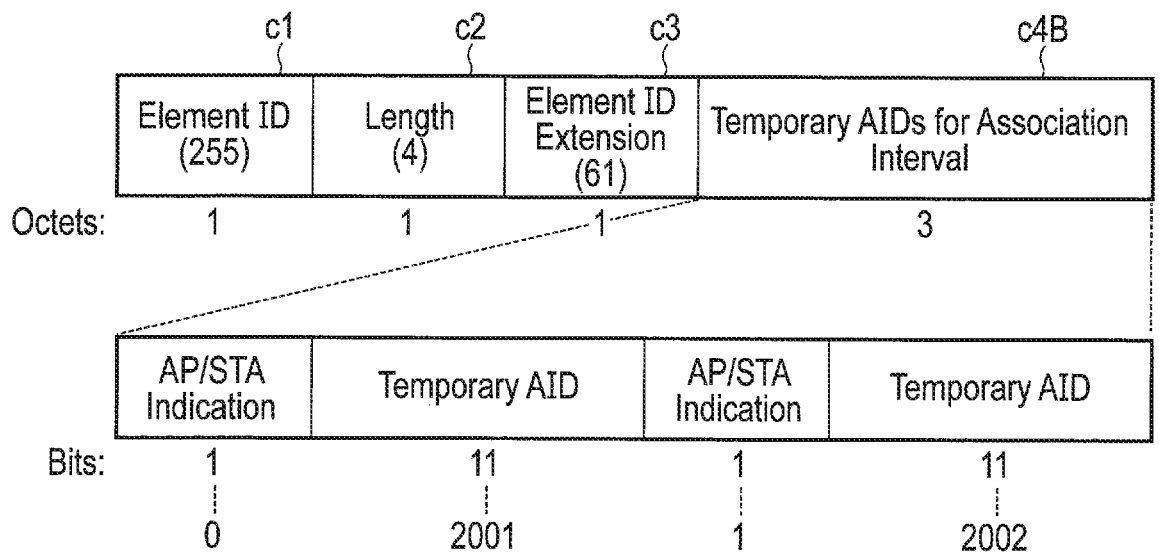
FIG. 9 is a diagram showing an example of a Temporary AIDs for Association Interval element created in the electronic apparatus of the second embodiment.

If the AID used in the HE-SIG-B is limited to the range of values of 1 to 2007, eleven bits are enough. Therefore, each AID designated in the Temporary AIDs for Association Interval element only needs to be expressed by up to eleven bits. For example, it is possible to consider providing an AP/STA Indication subfield for identifying whether a temporary AID is for an AP or an STA, identifying as the temporary AID for the AP if the subfield is 1 and as the temporary AID for the STA if the subfield is 0, and providing a subfield to which the temporary AID is written after this. In this case, the frame will have such a format as that of FIG. 9, for example.

Although this is only applicable to the case of assigning two temporary AIDs, it is also possible to remove this limitation by making the length of the Temporary AIDs for Association Interval field (c4B) variable. In addition, since this representation method does not explicitly shows that STA1 is AID=2001 and AP1 is AID=2002, it is necessary at AP2 to associate AID=2001 for an STA with STA1 and associate AID=2002 for an AP with AP1, together with the previously described MAC Address of Co-located AP element. Alternatively, it is possible to notify the MAC address of STA1 and its temporary AID and the MAC address of AP1 and its temporary AID. In that case, the previously described MAC Address of Co-located AP element is notified by this element and will not be required. Here, in a PHY packet of DL MU, in IEEE 802.11ax, a value for identifying a BSS called a BSS_COLOR is entered. In a case where AP2 multiplexes and transmits the Asoc Rsq from AP2 to STA1 and the Asoc Rsq from STA2 to AP1, for example, the BSS_COLOR which AP2 uses may be used as the BSS_COLOR of the multiplexed PHY packet.

Consequently, information necessary for configuring the HE-SIG-B is obtained, and frequency multiplexing, space multiplexing, and the like can be used. As described above, even before association is completed, it is possible to use various multiplexing technologies by assigning temporary values.

Now, the explanation of the process flow of bidirectional association relationship establishment will be continued with reference to FIGS. 8A and 8B.

In a case where AP2 performs aggregation (FIG. 8A), STA2, which is notified of the information about AP1, either notifies information necessary for Asoc Req generation to AP2 or transfers an Asoc Req whose destination address is AP1 to AP2 by using the information (S23).

As the information necessary for Asoc Req generation, for example, a parameter of an MLME-ASSOCIATE.request primitive which is input from an SME to a MAC sublayer management entity (MLME) in the IEEE 802.11 wireless LAN standard may be referred to. Here, in a case where AP2 receives information for an Asoc Req, AP2 creates an Asoc Req directed to AP1 from STA2 on behalf of STA2. As a result, AP2 can aggregate the Asoc Req together with the Asoc Rsp which AP2 created.

On the other hand, in a case where STA2 performs aggregation (FIG. 8B), AP2 passes information necessary for Asoc Rsp generation or an Asoc Rsp to be transmitted to STA1 to STA2, in addition to the notification of the information about AP1 (S23'). Similarly, STA2 can aggregate the Asoc Rsp together with the Asoc Req that STA2 created.

Either AP2 or STA2 which performed the aggregation of the Asoc Rsq and the Asoc Req transmits them to the wireless terminal 1 by unicast or multiplexing as described above (FIG. 8A: (S24), FIG. 8B: (S24')).

Here, an example of transmission using frame aggregation will be described. In the case of transmitting the Asoc Rsp and the Asoc Req which are frame-aggregated and constitute an Aggregate MAC Protocol Data Unit (A-MPDU), the MAC address of STA1 is entered in the first Address 1 field of the MAC Header of the Asoc Rsp as a transmission destination address (Receiver Address: RA), the MAC address of AP2 is entered in the next Address 2 field as a transmission source address (Transmitter Address: TA), and the MAC address of AP2 is entered in the Address 3 field as a BSSID. The MAC address of AP1 is entered in the Address 1 field of the MAC Header of the Asoc Req as an RA, the MAC address of STA2 is entered in the Address 2 field as a TA, and the MAC address of AP1 is entered in the Address 3 field as a BSSID. In this case, since the RA of the Asoc Rsp at the forefront is designated as STA1, STA1 receives and decodes the A-MPDU.

On the other hand, in the case of transmitting the A-MPDU from STA2, it is preferable that the Asoc Req should be entered at the forefront and then the Asoc Rsp should be entered. Consequently, the RA of the Asoc Req at the forefront is designated as AP1, AP1 receives and decodes the A-MPDU.

Figure 10:
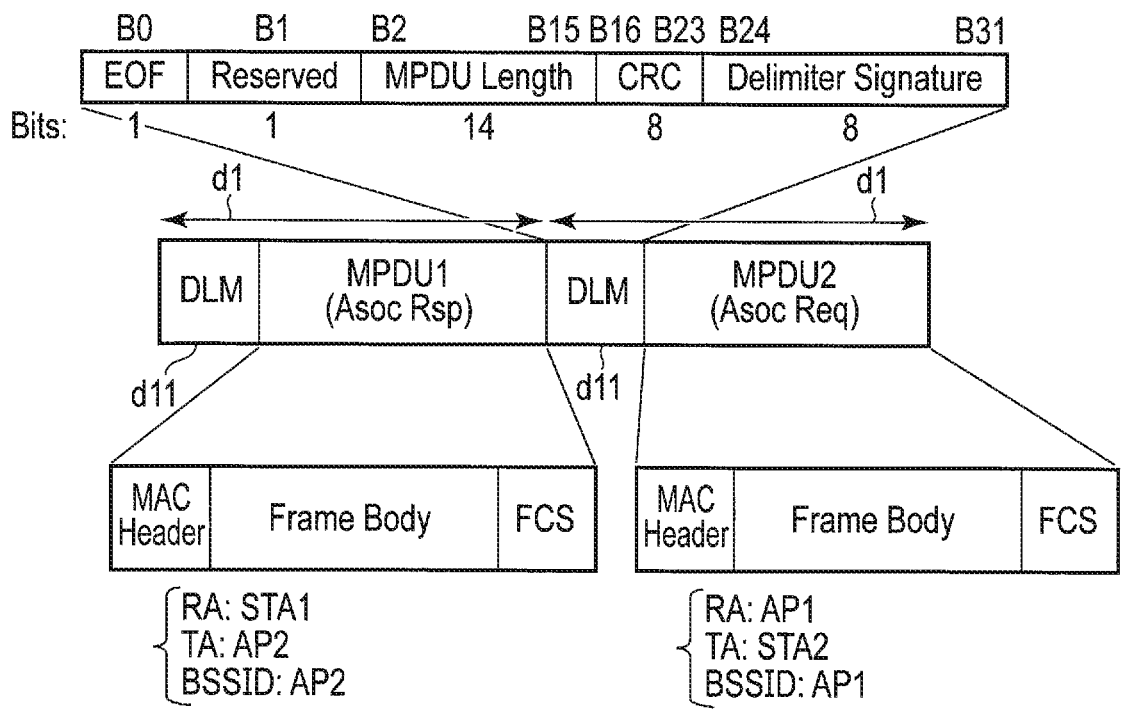
FIG. 10 is a diagram showing another example of the Temporary AIDs for Association Interval element defined in the electronic apparatus of the second embodiment.

FIG. 10 shows an example where frames are aggregated in the order of Asoc Rsp and Asoc Req. The Asoc Rsp and the Asoc Req are connected as MPDUs (d1) such that the boundary can be identified by a MPDU delimiter (DLM) (d11). The MPDU delimiter has a length of four octets, and is composed of an MPDU Length, an 8-bit CRC, a Delimiter Signature indicating the MPDU delimiter, and the like.

The above example is a case where transmission destination addresses are correctly designated in the MAC Headers of the aggregated Asoc Rsp and Asoc Req. However, it is possible to use such characteristics that "an Asoc Rsp is a frame to be processed by an STA" and "an Asoc Req is a frame to be processed by an AP". Alternatively, when correct information for an intended reception destination terminal (STA or AP) is included in an element as described above, frames are not necessarily aggregated as in the above-described example. For example, even when AP1 receives an Asoc Rsq and AP1 is designated as an RA, usually, an Asoc Rsq is processed by an STA, not an AP, and it is known that an STA is included in the same wireless terminal together with an AP. Therefore, AP1 can pass the Asoc Rsp to STA1 even if the RA is AP1.

In addition, it is possible to newly provide a Receiver Address of This Association Frame element, designate an original MAC address at which an association frame storing the element is received, that is, a MAC function block in its Information field, and store the element in the frame body of an association frame whose destination originally changes along the way (Asoc Req in a case where an Asoc Rsp is followed by an Asoc Rep). Even when AP1 is designated in the RA of the MAC Header of the Asoc Req, if the MAC function block of AP1 passes the Asoc Rsp or information extracted from the Asoc Rsp frame to the MAC function block of STA1 at the time of processing the MAC frame, it is possible to execute processing in a manner similar to that of a case where the Asoc Rsp is received by the MAC function block of STA1, and know that the association process with AP2 is completed (and that an AID assigned by an AID field will be used with AP2 from now on in a case where the Status Code in the Asoc Rsp is 0 (SUCCESS)).

Now, the explanation of the process flow of bidirectional association relationship establishment will be continued with reference to FIGS. 8A and 8B.

In some cases, the frame transmitted by AP2 or STA2 is correctly received by STA1 and AP1. However, the frame transmitted by AP2 or STA2 is received by a MAC function block different from an original MAC function block, that is, the Asoc Rsp may be received by AP1 and the Asoc Req may be received by STA1 in other cases. In the latter case, since AP1 and STA1 cannot process the received frame, AP1 and STA1 transfer the frame to other MAC function blocks via such as the Abstraction function block, etc., (FIG. 8A: (S25), FIG. 8B: (S25')).

At this time, the frame may be transferred to another MAC function block in a form of a MAC protocol data unit (MPDU), may be transferred to another MAC function block in a form of a MAC service data unit (MSDU), or may be transferred to another MAC function block at a specific information level. In the case of transferring the frame to another MAC function block in a form of an MPDU, the frame may be input via an interface of another MAC function block with its PHY. This is performed under a rule, and in the present embodiment, the method is not limited to any particular method as long as desired information can be correctly notified to another MAC function block.

Here, if the frame cannot be processed by all the holding MAC function blocks, the frame will be discarded.

STA1 processes the received Asoc Rsp, and consequently, the association between AP2 and STA1 is completed. In addition, STA2 processes the received Asoc Rsp, and consequently, the association between AP1 and STA2 is completed.

As described above, in the electronic apparatus of the present embodiment, since frames are aggregated or multiplexed and transmitted in addition to the first embodiment, efficiency is further improved.

Third Embodiment

Next, the third embodiment will be described.

Since the present embodiment is basically based on the second embodiment, differences will be mainly described here.

Figure 11A:
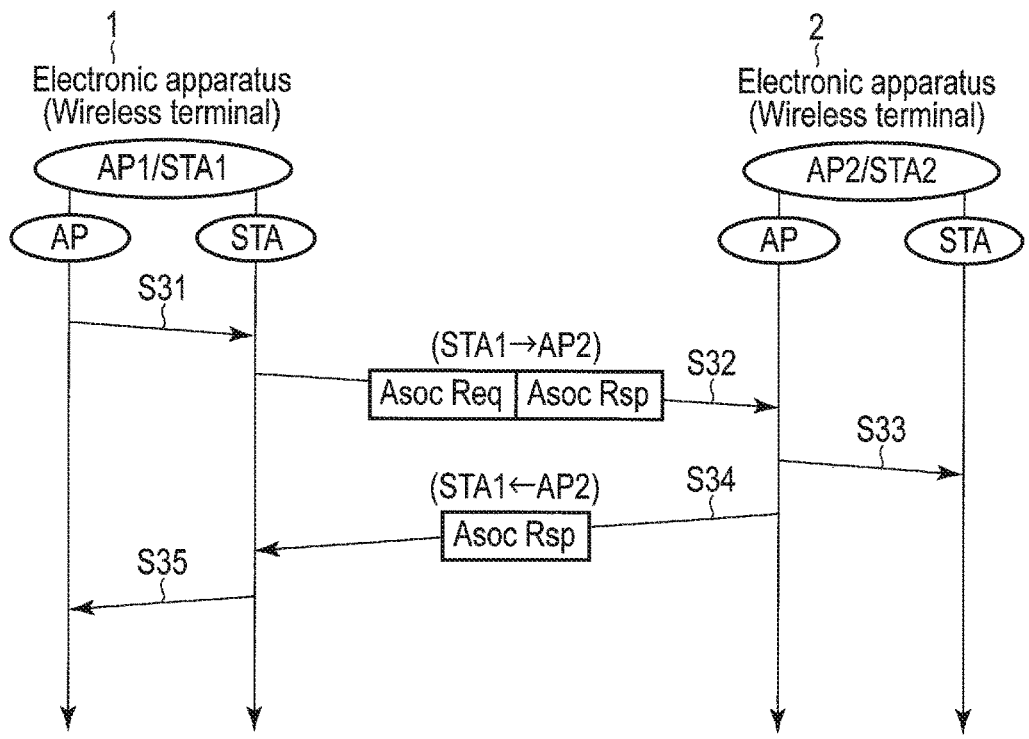
FIG. 11A is a diagram showing an example of a process flow of bidirectional association relationship establishment of an electronic apparatus of the third embodiment in a case where an STA aggregates an Asoc Rsp and an Asoc Req).
Figure 11B:
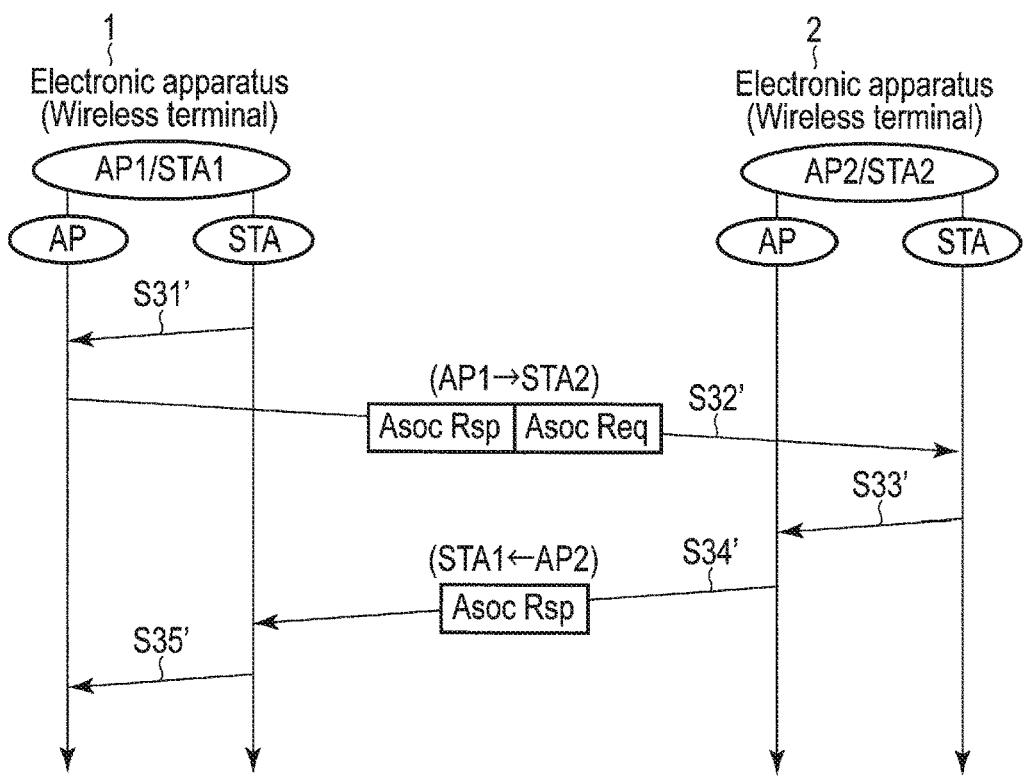
FIG. 11B is a diagram showing another example of the process flow of bidirectional association relationship establishment of the electronic apparatus of the third embodiment in a case where an AP of FIG. 8A aggregates an Asoc Rsp and an Asoc Req.

Each of FIGS. 11A and 11B shows an example of a process flow of bidirectional association relationship establishment in the electronic apparatuses (wireless terminal 1 and wireless terminal 2) of the present embodiment.

The present embodiment differs from the second embodiment in that, while the Asoc Req transmitted from STA1 becomes a trigger and the process flow for executing association is started in the second embodiment, the Asoc Req is omitted in the present embodiment. Therefore, in the present embodiment, the wireless terminal 1 performs an operation similar to that of the wireless terminal 2 in the second embodiment and the wireless terminal 2 performs an operation similar to that of the wireless terminal 1 in the second embodiment.

In the present embodiment, it is assumed that AP1 already knows the presence of STA2 and the information about STA2. Even though the wireless terminal 1 has not received an Asoc Req from STA2, the wireless terminal 1 transmits an Asoc Rsp whose transmission destination is set to STA2. That is, (S21) shown in FIGS. 8A and 8B of the second embodiment will be omitted.

Here, as the means for making the presence of STA2 and the information about STA2 known, it is possible to use a Beacon or a Probe Response or determine by a precondition. In the case of notifying information by a Beacon or a Probe Response, the Vendor Specific information is used, or a completely new element is added. Consequently, it is possible to notify information about another STA or AP existing in the wireless terminal. In the case of making the information about the presence or absence of an AP/STA existing in the wireless terminal known by a precondition, for example, it is possible to set such a rule that a wireless terminal to be added to a network must comprises two MAC function blocks and the difference between the MAC addresses is only one and the MAC address of an AP is smaller (closer to 0), etc. In this case, it is possible to obtain the MAC address of the AP of the wireless terminal newly added to the network from an Address field notifying a TA or a BSSID in a MAC Header by receiving a Beacon, etc. For example, in a case where the presence of at least another MAC function block as an STA is a precondition, it is possible to simultaneously understand that the MAC address of the MAC function block of the STA is such a MAC address that the last number of the MAC address of the AP is increased by one.

The wireless terminal 1 transmits an Asoc Req and an Asoc Rsp to the wireless terminal 2. FIGS. 11A and 11B show an example where STA1 (FIG. 11A) or AP1 (FIG. 11B) aggregates and transmits these association frames. Note that, as is the case with the first embodiment, AP1 may transmit an Asoc Rsp and STA1 may transmit an Asoc Req, respectively.

When STA1 performs aggregation and transmission (FIG. 11A), AP1 transmits an Asoc Rsp frame or information necessary for generation to STA1 (S31). On the other hand, when AP1 performs aggregation and transmission (FIG. 11B), STA1 transmits an Asoc Req frame or information necessary for generation to AP1 (S31').

After that, the flow proceeds in the same manner as the second embodiment, while the wireless terminals 1 and 2 are reversed as compared to the second embodiment (S32 [S32'] and S33 [S33']).

Finally, AP2 transmits an Asoc Rsp to STA1 and an association relationship is established (S34 [S34']). Here, information (flag) indicating the result of the association relationship establishment between AP1 and STA2 may be added to this Asoc Rsp. For example, a new element called a Status Code of The Other Association is defined, a value is assigned in a manner similar to a normal Status Code field, and the content of the Status Code of the received Asoc Rsp from AP1 to STA2 is copied and entered. For example, if the Status Code of the Asoc Rsp from AP1 to STA2 is 0 and SUCCESS, the same value is entered in the Status Code of The Other Association element and included in the Asoc Rsp from AP2 to STA1. In the method using this element, in the case of FIG. 11A, STA1 needs to notify the result of the association relationship between AP1 and STA2 to AP1 (S35). As a result, AP1 can always determine that the Asoc Rsp transmitted from AP1 to STA2 is correctly received by STA2 and an association relationship is successfully established between AP1 and STA2. Consequently, the wireless terminal 1 can determine that an association relationship is established with the wireless terminal 2, based on the transmission of the Asoc Rsp.

Alternatively, it is possible to make AP1 understand that the Asoc Rsp transmitted from AP1 to STA2 is successfully received by STA2 by making STA2 transmit an Ack or a BlockAck in response to the Asoc Req+the Asoc Rsp (here+means aggregation or multiplexing) transmitted from AP1 to STA2. As a normal operation, in response to a management frame which designates a MAC address as an RA by unicast, an Ack frame is transmitted a short interframe space (SIFS) time after the management frame on the receiver side. The SIFS is a minimum frame space necessary for switching between transmission and reception, and the value is 16 µs in the case of an IEEE 802.11 wireless LAN used with a 20 MHz channel spacing in a 5 GHz band, for example. In the figures (FIGS. 5, 8A and 8B) showing frame exchange described heretofore, transmission of an Ack frame or a BlockAck which will be described later, after a SIFS time is omitted. An Asoc Req and an Asoc Rsp, which are management frames, are transmitted after a fixed time longer than a SIFS time and a random backoff period. Therefore, in the case of a frame transmitted in a form of an Asoc Req+an Asoc Rsp also, an Ack frame is transmitted. In this case, in the example of FIG. 11A, since the Ack frame is transmitted from AP2 to STA1, STA1 needs to notify that the Asoc Rsp from AP1 to STA2 is correctly received by STA2 (since the Ack is received the SIFS time after the transmission of the Asoc Req+the Asoc Rsp, notification from STA1 to AP1 is performed at this time instead of (S35)).

Figure 12:
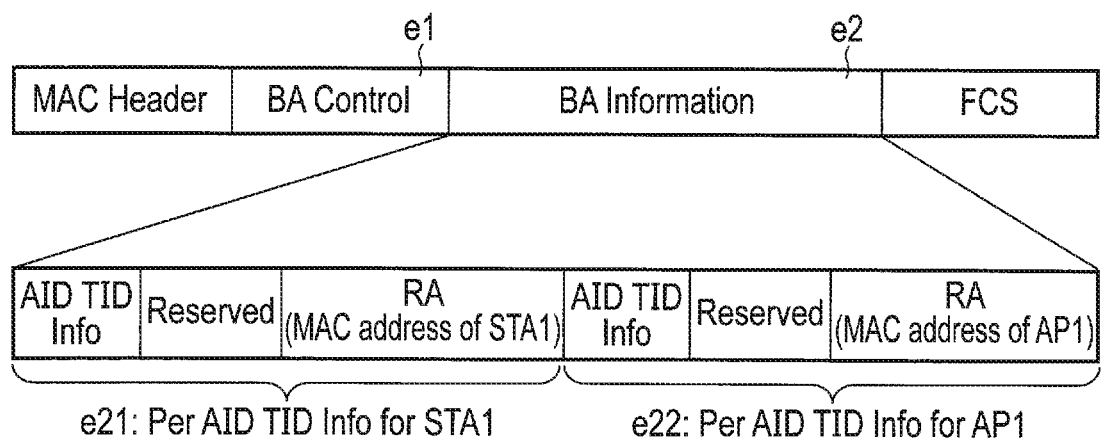
FIG. 12 is a diagram showing an example of a BlockAck frame which can be used in the electronic apparatus of the third embodiment.

In a case where two frames, that is, an Asoc Req and an Asoc Rsp are aggregated, originally, Ack frames should be transmitted to the MAC frames, respectively. Therefore, it is possible to make a response in a mode adopting a Multi-STA BlockAck in IEEE 802.11ax. For example, this BlockAck frame takes such a form shown in FIG. 12. Although a BA Type subfield of a BA Control field (e1) can define a new BlockAck variant, a Multi-STA BlockAck in IEEE 802.11ax will be used here. In the Multi-STA BlockAck, the value of the BA Type subfield is 11. A BA Information field (e2) is provided in Per AID TID Info subfield units, and the first Per AID TID Info subfield (e21) notifies an Ack directed to STA1 and the second Per AID TID Info subfield (e22)

notifies an Ack directed to AP1, and MAC addresses are entered in the RA fields, respectively. As the entire Multi-STA BlockAck, an RA is entered in the Address field at the forefront of the MAC Header, and a broadcast address is entered in this RA. Therefore, according to the Multi-STA BlockAck, transmission acknowledgments can be obtained when AP1 and STA1 receive. Consequently, unlike the element or the Ack, the notification from STA1 to AP1 is not required (unlike (S35), notification from STA1 to AP1 is not required). Each AID TID Info subfield is further divided into an AID11 subfield, an Ack Type subfield, and a TID subfield, but regardless of whether the AID TID Info subfield is directed to STA1 or AP1, 2045 is set to the AID11, 0 is set to the Ack Type, and 15 is set to the TID in common. This is the same as a method for transmitting an Ack response in a mode of Multi-STA BlockAck in response to a management frame transmitted from each STA which is unassociated in UORA, which will be described later. As the multi-STA BlockAck is transmitted, STA1 understands that the Asoc Rep transmitted from STA1 to AP2 is received by AP2 from the fact that the MAC address of STA1 is described in the RA subfield of the Per AID TID Info subfield. In addition, AP1 understands that the Asoc Rsp transmitted from AP1 to STA2 is received by STA2 from the fact that the MAC address of AP1 is described in the RA subfield of the Per AID TID Info subfield, and AP1 can determine that the association process between AP1 and STA2 ended. If one of the Per AID TID Info subfields does not exist, it means that the frame is not received on the wireless terminal 2 side. Therefore, the frame needs to be appropriately retransmitted.

On the other hand, if it is impossible to confirm that the association relationship between AP1 and STA2 is established on the wireless terminal 1 side, AP1 needs to retransmit the Asoc Rsp. Regarding the process of retransmitting the Asoc Rsp from AP1, various steps can be applied.

For example, in a case where an ACK of (S32) [the case of FIG. 11A] is expected and retransmission is to be determined using this Ack, STA1 notifies the presence or absence of an ACK of the Asoc Rsp which STA1 receives a certain time (SIFS time) after the transmission of the frame in (S32). As a result, AP1 can know the presence or absence of the ACK of the Asoc Rsp, and if there is no ACK, AP1 proceeds to a retransmission process of the Asoc Rsp (more specifically, AP1 obtains a chance of transmission based on CSMA/CA and performs transmission. The same applies hereafter).

Furthermore, in a case where an ACK of (S32') [the case of FIG. 11B] is expected and retransmission is determined using this ACK, since the receiver of the ACK is AP1, if AP1 does not receive the ACK a certain time (SIFS time) after the transmission of the frame in (S32'), AP1 proceeds to the retransmission process of the Asoc Rsp.

Alternatively, in a case where a Multi-STA BlockAck to (S32) or (S32') is expected and retransmission is determined using this Multi-STA BlockAck, since this Multi-STA BlockAck can be received by each of AP1 and STA1, if AP1 does not receive the Multi-STA BlockAck itself a certain time after the transmission of the frame by (S32) or (S32') or if the MAC address of AP1 cannot be detected in the RA subfield of the Per AID TID Info subfield of the Multi-STA BlockAck, AP1 proceeds to the retransmission process of the Asoc Rsp.

Alternatively, in the case of being notified by the Asoc Rsp in (S34) [the case of FIG. 11A], AP1 receives a notification of the content (Status Code of The Other Association element or ACK bit) indicated in the Asoc Rsp of (S34) (does not receive the presence or absence of an ACK of the Asoc Rsp transmitted in (S32)) from STA1. As a result, if it is determined that the association between AP1 and STA2 is not established, AP1 proceeds to the retransmission process of the Asoc Rsp.

In the present embodiment, according to the situation that the Asoc Rsp from AP1 to STA2 is transmitted while the Asoc Rep is being omitted, it is important to explicitly inform AP1 when STA2 cannot accept the Asoc Rsp because, for example, STA2 has already established an association relationship with another AP. This is to prevent AP1 from transmitting an Asoc Rsp over and over again to STA2 which cannot be associated.

Next, instead of the method for using the Status Code of The Other Association element and rewriting to an appropriate Status Code indicating FAILURE without copying the Status Code of the Asoc Rsp indicating 0 (SUCCESS), a method for using a Disassociation frame (DisAsoc) will be described.

By using a DisAsoc, an STA can notify cancellation of a relationship to an AP with which the STA establishes an association relationship. In the DisAsoc, a Reason Code field is entered in the frame body. The notification of the reason for withdrawal of the association relationship by the Reason Code field helps AP1 which received the DisAsoc to make an appropriate determination later. An example of the Reason Code indicating the reason why an STA needs to transition to another AP is 12, that is, a BSS_TRANSITION_ DISASSOC. Accordingly, cancellation of the relationship and the reason can be notified to the AP with which the association relation is currently established. In the case of specifically notifying the rejection reason of the STA in the present embodiment instead of using the value defined in the existing Reason Code, it is possible to newly define the rejection reason in a reserved Reason Code 0, 67 to 65 535. For example, when STA2 has already established an association relationship with another AP and therefore STA2 cannot establish an association relationship with AP1, if a Reason Code indicating an STA ASSOCIATED is newly defined as, for example, 67, the content can be notified to AP1 by a DisAsoc frame in which the Reason Code 67 is entered.

As described above, in the electronic apparatus of the present embodiment, transmission of the Asoc Rep from STA1 (FIG. 8A (S21) and FIG. 8B (S21')) in the second embodiment can be omitted.

Fourth Embodiment

Next, the fourth embodiment will be described.

Since the present embodiment is basically based on the third embodiment, differences will be mainly described here.

Figure 13A:
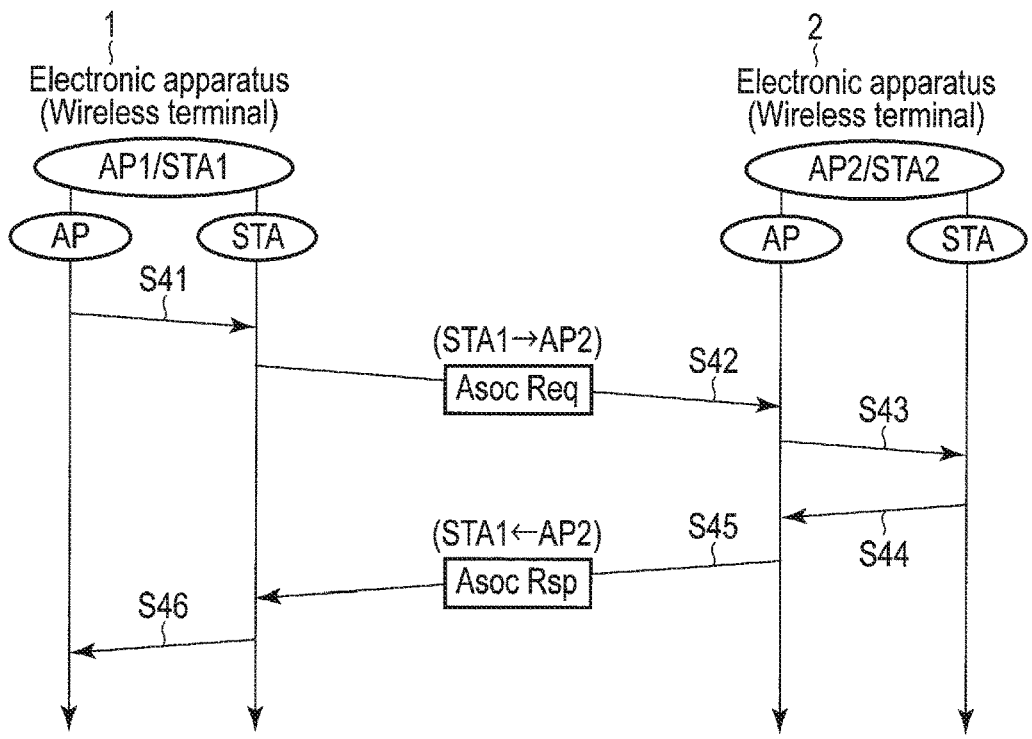
FIG. 13A is a diagram showing an example of a process flow of bidirectional association relationship establishment of an electronic apparatus of the fourth embodiment (in a case of transmitting an Asoc Req).
Figure 13B:
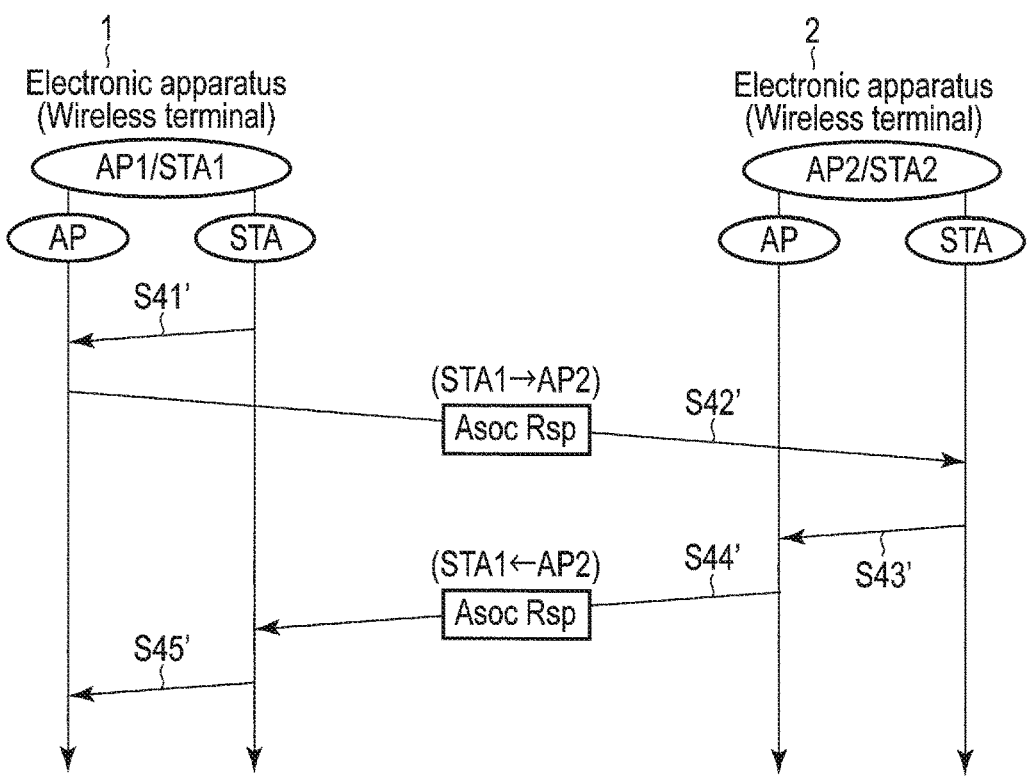
FIG. 13B is a diagram showing another example of the process flow of bidirectional association relationship establishment of the electronic apparatus of the fourth embodiment (in a case of transmitting an Asoc Rsp).

Each of FIGS. 13A and 13B shows an example of a process flow of bidirectional association relationship establishment in the electronic apparatuses (wireless terminal 1 and wireless terminal 2) of the present embodiment.

The present embodiment differs from the third embodiment in that, while the Asoc Rep and the Asoc Rsp from the wireless terminal 1 become triggers and the process is started in the third embodiment, only one of them is transmitted in the present embodiment.

That is, one of the Asoc Req and the Asoc Rsp transmitted in (S32) [FIG. 11A] or (S32') [FIG. 11B] in the third embodiment described above is not transmitted in the present embodiment. Clearly, if one of them is not transmitted, in either case, information to be originally notified will be missing. In other words, if this missing information can be shared, it is possible to establish the association relationship without transmitting one of them.

As an example of the missing information, the MAC address of STA1, etc., may be considered in a case where the Asoc Req is not transmitted and the AID assigned to STA2, etc., may be considered in a case where the Asoc Rsp is not transmitted. Regarding the way to share the information without transmitting one of the Asoc Req and the Asoc Rsp, for example, the information may be set as common information by a precondition or the information may be shared in advance by using a Beacon or a Probe Response.

Alternatively, it is possible to make the information of the association frame which is not transmitted and the information of the association frame which is transmitted or the known information common, or calculate the missing information from the information of the association frame which is transmitted or the known information by setting a rule. The information which can be made common between the Asoc Rsp and the Asoc Req is, for example, HT Capability. In addition, if the MAC addresses of AP1 and STA1 are determined as consecutive numbers, the MAC address of STA1 can be calculated from the MAC address of AP1, and conversely, the MAC address of AP1 can be calculated from the MAC address of STA1.

Furthermore, the information which is not transmitted may be added to the association frame which is transmitted, as a new element or a Vendor Specific element. Consequently, the wireless terminal 1 can determine that the bidirectional association relationship (between AP1 and STA2 and between AP2 and STA1) with the wireless terminal 2 is established, based on the receipt of the Asoc Rsp from the wireless terminal 2 in response to the Asoc Req (between AP2 and STA1) transmitted to the wireless terminal 2. Alternatively, the wireless terminal 1 can determine that the bidirectional association relationship (between AP1 and STA2 and between AP2 and STA1) with the wireless terminal 2 is established, based on the receipt of the Asoc Rsp (between AP2 and STA1) from the wireless terminal 2 after the transmission of the Asoc Rsp (between AP1 and STA2) to the wireless terminal 2. On the other hand, the wireless terminal 2 can determine that the bidirectional association relationship (between AP1 and STA2 and between AP2 and STA1) with the wireless terminal 1 is established, based on the transmission of the Asoc Rsp to the wireless terminal 1 in response to the Asoc Rep (between AP2 and STA1) received from the wireless terminal 1. Alternatively, the wireless terminal 2 can determine that the bidirectional association relationship (between AP1 and STA2 and between AP2 and STA1) with the wireless terminal 1 is established, based on the transmission of the Asoc Rsp (between AP2 and STA1) to the wireless terminal 1 after the receipt of the Asoc Rsp (between AP2 and STA1) from the wireless terminal 1.

As described above, in the electronic apparatus of the present embodiment, regarding the transmission of the Asoc Req and the Asoc Rsp from the wireless terminal 1 in the third embodiment (FIG. 11A: (S32), FIG. 11B: (S32')), only the Asoc Req (FIG. 13A: (S42)) or only the Asoc Rsp (FIG. 13B: (S42')) can be transmitted instead.

Fifth Embodiment

Next, the fifth embodiment will be described.

Since the present embodiment is basically based on the first embodiment to the fourth embodiment, differences will be mainly described here.

Figure 14:
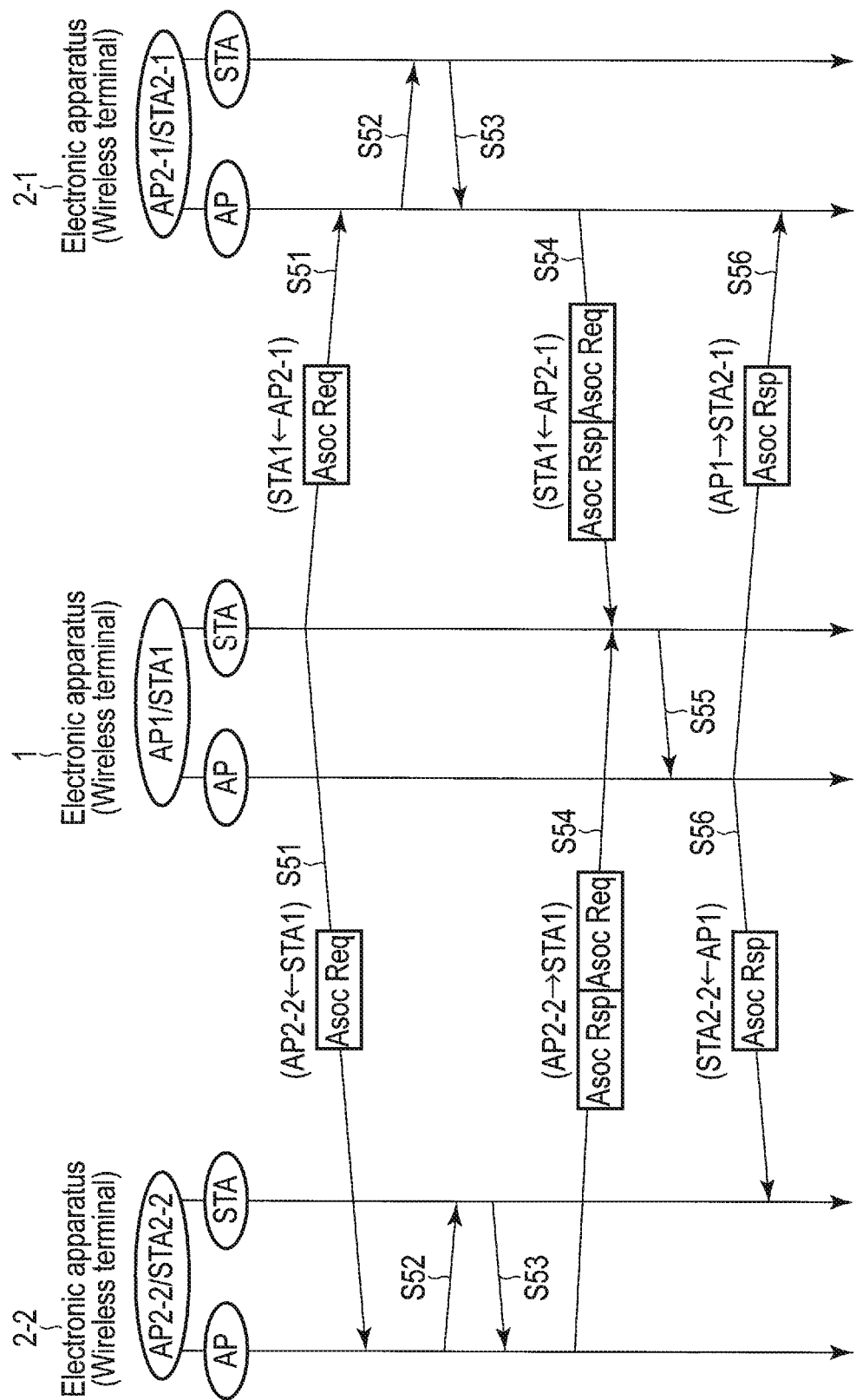
FIG. 14 is a diagram showing an example of a process flow of bidirectional association relationship establishment of an electronic apparatus of the fifth embodiment.

FIG. 14 shows an example of a process flow of bidirectional association relationship establishment in the electronic apparatuses (wireless terminal 1 and wireless terminal 2) of the present embodiment.

As shown in FIG. 14, a plurality of wireless terminals 2 (wireless terminals 2-1, 2-2, . . . , 2-N) are provided in the present embodiment. Although FIG. 14 shows a case where a plurality of wireless terminals 2 are provided in the second embodiment (FIG. 8A), the present embodiment can be applied to the first embodiment to the fourth embodiment described above.

First, an RA of a MAC frame to be transmitted from the wireless terminal 1 is set to a broadcast address, and an association frame is broadcasted to the wireless terminals 2-1, 2-2, . . . , 2-N (S51). At the time of broadcast, an information portion directed to each of the wireless terminals 2-1, 2-2, . . . , 2-N of the association frame may be multiplexed, or a new element including the information about each of the wireless terminals 2-1, 2-2, . . . , 2-N and the address of each of the wireless terminals 2-1, 2-2, . . . , 2-N in one frame may be provided.

Since each of the wireless terminals 2-1, 2-2, . . . , 2-N which received the association frame transmitted by broadcast receives information directed to wireless terminals other than itself, each of the wireless terminals 2-1, 2-2, . . . , 2-N checks the RA and extracts information directed to itself (or directed to all the wireless terminals), and proceeds to the subsequence process (process of returning an Asoc Rsp in (S54) in the example of FIG. 14).

The frames from the wireless terminals 2-1, 2-2, . . . , 2-N are transmitted to the wireless terminal 1 by MU communication. To realize this, temporary AIDs are defined or uplink OFDMA-based random access (UORA) is used.

In the case of defining temporary AIDs, before MU communication is performed, there needs to be a frame which is transmitted from an AP to a plurality of STAs as a precondition. Note that the frame is not necessarily an association frame and may be a Beacon frame or a Probe frame for allocating temporary AIDs.

In addition, in the case of integrating frames in an UL MU, an AP needs to transmit a trigger frame. A wireless terminal having a frame to be transmitted to an AP transmits the frame a certain time (SIFS) after receipt of a trigger frame.

Here, the UORA is UL OFDMA which can be realized without designation of a terminal to an RU. An STA having a transmission frame determines whether or not to perform transmission to an RU in which an AID is not designated in a manner similar to the random access of CSMA/CA. If two or more terminals select the same RU and perform transmissions, the transmissions fail due to collision. If the AID of the RU is 2045, a terminal to which an AID has not been assigned can be used. A terminal to which an AID has not been assigned can only transmit one management frame by the RU. An AP sets an AID to 2045 in a Multi-STA BlockAck frame, and enters the MAC address of a terminal whose frame was received successfully in a region in which a BlockAck bitmap is normally provided, as a substitute for an ACK to the terminal. Consequently, an AP enables a plurality of STAs to simultaneously transmit frames even before association.

As described above, in the electronic apparatus of the present embodiment, a bidirectional association relationship can be efficiently established with a plurality of external apparatuses.

According to the electronic apparatuses of the embodiments described above, it is possible, by a method for efficiently associating two electronic apparatuses, to realize bidirectional MU communication which cannot be realized by a one-way relationship between the electronic apparatuses and improve time efficiency of information transmission.

In addition, a simultaneous transmission/reception request in routing in a mesh network, diverse routing (route diversity), network monitoring or the like can be more easily realized.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
receiver circuitry configured to receive a first association request frame from a first electronic apparatus; and
transmitter circuitry configured to:
  transmit a first association response frame corresponding to the first association request frame to the first electronic apparatus; and
  transmit a second association request frame to the first electronic apparatus, in response to receipt of the first association request frame.

2. The electronic apparatus of claim 1, wherein:
the first association request frame includes first information identifying that the first electronic apparatus comprises a first station module designated at a first MAC address and a first access point module designated at a second MAC address different from the first MAC address;
the first association request frame is transmitted from the first station module of the first electronic apparatus; and
the second association request frame is transmitted from a second access point module of the first electronic apparatus.

3. The electronic apparatus of claim 2, wherein:
the first information comprises information about the second MAC address; and
the transmitter circuitry transmits the second association request frame using the second MAC address.

4. The electronic apparatus of claim 2, further comprising:
a second station module designated at a third MAC address; and
a second access point module designated at a fourth MAC address differing different from the third MAC address,
wherein the transmitter circuitry corresponding to the second station module transmits the second association request frame.

5. The electronic apparatus of claim 4, wherein:
the receiver circuitry corresponding to the second access point module receives the first association request frame;
the transmitter circuitry corresponding to the second access point module transmits the second association request frame; and
an association relationship between the first station module and the second access point module and an association relationship between the second station module and the first access point module are simultaneously established.

6. The electronic apparatus of claim 1, wherein the transmitter circuitry transmits a first physical frame including the first association response frame and the second association request frame to the first electronic apparatus.

7. An electronic apparatus comprising:
transmitter circuitry configured to transmit a first association request frame to a first electronic apparatus and transmits a second association response frame to the first electronic apparatus; and
receiver circuitry configured to receive a first association response frame corresponding to the first association request frame, after the first association request and the second association response frame are transmitted.

8. The electronic apparatus of claim 7, wherein a first association relationship with the first electronic apparatus by the first association request frame and the first association response frame, and a second association relationship with the first electronic apparatus by the second association response frame are simultaneously established.

9. The electronic apparatus of claim 7, wherein the transmitter circuitry transmits a physical frame including the first association request frame and the second association response frame to the first electronic apparatus.

10. The electronic apparatus of claim 7, further comprising controller circuitry configured to determine that an association relationship with the first electronic apparatus is established, based on transmission of the first association response frame.

11. The electronic apparatus of claim 7, wherein:
the transmitter circuitry transmits the first association request frame by broadcast,
the first association request frame is received by the first electronic apparatus and a second electronic apparatus; and
the receiver circuitry receives the first association response frame from the first electronic apparatus, and receives an association response frame corresponding to the first association request frame from the second electronic apparatus.

12. An electronic apparatus comprising:
receiver circuitry configured to:
  receive a first association request frame from the first electronic apparatus; and
  receive a second association response frame from the first electronic apparatus; and
transmitter circuitry configured to transmit a first association response frame corresponding to the first association request frame, after the first association frame and the second association response frame are received.

13. The electronic apparatus of claim 12, wherein a first association relationship with the first electronic apparatus by the first association request frame and the first association response frame, and a second association relationship with the first electronic apparatus by the second association response frame are simultaneously established.

14. The electronic apparatus of claim 12, wherein the receiver circuitry receives a physical frame including the first association request frame and the second association response frame from the first electronic apparatus.

15. An electronic apparatus comprising:
transmitter circuitry configured to transmit a first association request frame to a first electronic apparatus;

receiver circuitry configured to receive a first association response frame corresponding to the first association request frame from the first electronic apparatus; and
controller circuitry configured to determine that an association relationship with a first station module of the first electronic apparatus and an association relationship with a first access point module of the first electronic apparatus are established, based on receipt of the first association response frame,
wherein the first association request frame includes information on a MAC address and capability of an access point module of the electronic apparatus.

16. An electronic apparatus of claim 15, comprising:
transmitter circuitry configured to transmit a first association request frame to a first electronic apparatus;
receiver circuitry configured to receive a first association response frame corresponding to the first association request frame from the first electronic apparatus; and
controller circuitry configured to determine that an association relationship with a first station module of the first electronic apparatus and an association relationship with a first access point module of the first electronic apparatus are established, based on receipt of the first association response frame,
wherein:
the transmitter circuitry transmits the first association request frame by broadcast;
the first association request frame is received by the first electronic apparatus and a second electronic apparatus; and
the receiver circuitry receives the first association response frame from the first electronic apparatus, and receives an association response frame corresponding to the first association request frame from the second electronic apparatus.

17. An electronic apparatus comprising:
receiver circuitry configured to receive a first association request frame from a first electronic apparatus;
transmitter circuitry configured to transmit a first association response frame corresponding to the first association request frame to the first electronic apparatus when the first association request frame is received; and
controller circuitry configured to determine that an association relationship with a first station module of the first electronic apparatus and an association relationship with a first access point module of the first electronic apparatus are established, based on transmission of the first association response frame,
wherein the first association request frame includes information on a MAC address and capability of the first access point module of the first electronic apparatus.

18. An electronic apparatus comprising:
transmitter circuitry configured to transmit a first association response frame to a first electronic apparatus;
receiver circuitry configured to receive a second association response frame from the first electronic apparatus after the first association response frame is transmitted; and
controller circuitry configured to determine that an association relationship with a first station module of the first electronic apparatus and an association relationship with a first access point module of the first electronic apparatus are established, based on receipt of the second association response frame.

19. The electronic apparatus of claim 18, wherein:
the transmitter circuitry transmits the first association response frame by broadcast;
the first association response frame is received by the first electronic apparatus and a second electronic apparatus; and
the receiver circuitry receives the second association response frame from the first electronic apparatus, and receives a third association response frame from the second electronic apparatus.

20. An electronic apparatus comprising:
receiver circuitry configured to receive a first association response frame from a first electronic apparatus;
transmitter circuitry configured to transmit a second association response frame to the first electronic apparatus after the first association response frame is received; and
controller circuitry configured to determine that an association relationship with a first station module of the first electronic apparatus and an association relationship with a first access point module of the first electronic apparatus are established, according to transmission of the second association response frame.

* * * * *